United States Patent
Nakashima et al.

(10) Patent No.: US 6,314,300 B1
(45) Date of Patent: *Nov. 6, 2001

(54) MOBILE COMMUNICATION SYSTEM FOR SUPPORTING MULTIPLE SIMULTANEOUS COMMUNICATIONS ON SINGLE MOBILE TERMINAL

(75) Inventors: Akiko Nakashima, Kokubunji; Mutsumaru Miki, Urawa; Katsuhiko Yamagata, Yokohama; Akira Kaiyama, Kanagawa, all of (JP)

(73) Assignee: NTT Mobile Communications Network Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,185

(22) Filed: Jun. 20, 1997

(30) Foreign Application Priority Data

Jun. 21, 1996 (JP) ........................................ 8-161950

(51) Int. Cl.[7] .................................................. H04Q 7/20
(52) U.S. Cl. ........................ 455/517; 455/528; 455/414
(58) Field of Search .................................. 455/422, 517, 455/524, 528, 38.3, 343, 436, 450, 466, 414, 435, 415, 552, 553

(56) References Cited

U.S. PATENT DOCUMENTS

| 4,972,507 | * | 11/1990 | Lusignan | 455/528 |
|---|---|---|---|---|
| 5,101,500 | * | 3/1992 | Marui | 455/551 |
| 5,287,552 | * | 2/1994 | Sasuta et al. | 455/528 |
| 5,355,518 | * | 10/1994 | Kindinger et al. | 455/38.3 |
| 5,428,666 | * | 6/1995 | Fyfe et al. | 455/551 |
| 5,608,780 | * | 3/1997 | Gerszberg et al. | 455/436 |
| 5,926,755 | * | 7/1999 | Ghisler | 455/414 |
| 5,960,365 | * | 9/1999 | Leih et al. | 455/435 |

* cited by examiner

Primary Examiner—Lester G. Kincaid
(74) Attorney, Agent, or Firm—Oblon, Spivak, McClelland, Maier & Neustadt, P.C.

(57) ABSTRACT

A mobile communication system which is capable of supporting multiple simultaneous communications on a single mobile terminal device, and collectively controlling all or a part of call states on a mobile terminal device. The system includes at least one mobile terminal device having: more than one mobile terminal side call control units for controlling calls at a mobile terminal side; and a mobile terminal side mobile terminal management unit for managing a communication state of the mobile terminal device while identifying each mobile terminal side call control unit which is currently in communication. The system also includes a network device having: a plurality of network side call control units for controlling calls at a network side; and a network side mobile terminal management unit, provided in correspondence to the mobile terminal device, for managing the communication state of the mobile terminal device and correspondences between said plurality of network side call control units and the mobile terminal device while identifying each network side call control unit which is currently in communication.

19 Claims, 13 Drawing Sheets

MOBILE COMMUNICATION SYSTEM FOR SUPPORTING MULTIPLE SIMULTANEOUS COMMUNICATIONS ON SINGLE MOBILE TERMINAL

BACKGROUND OF THE INVENTION

1. Field of the Invention

The present invention relates to a mobile communication for carrying out multiple simultaneous communications using a plurality of independent calls on each mobile terminal device.

2. Description of the Background Art

As shown in FIG. 1, the conventional mobile communication system generally comprises a mobile terminal device 100 and a network device 101 which are connected through a communication channel 103. The mobile terminal device 100 and the network device 101 are provided with respective call control units 104 and 105 so that the call origination control and the call termination control are carried out by the call control units 104 and 105.

In such a conventional mobile communication system, a possibility of more than one simultaneous communications on a single mobile terminal device has not been taken into account, so that the communication state and the call state of the mobile terminal device are expected to be identical during the communication, and for this reason no function for managing the communication state of the mobile terminal device has been provided in either the mobile terminal device 100 or the network device 101.

Because of this lack of a function for managing the communication state of the mobile terminal device, it has been impossible in the conventional mobile communication system to ascertain the correspondences between the call control unit 104 of the mobile terminal device 100 and the call control unit 105 of the network device 101.

As a consequence, if more than one simultaneous communications are attempted On a single mobile terminal device by simply providing additional transmission and reception devices and using the conventional call management scheme, there arises a problem that the network device 101 would carry out the unnecessary paging operation when the subsequent call is terminated at that mobile terminal device, despite of the fact that the network device 101 already ascertained the channel connection target from the earlier communication.

In addition, there is also a problem that it has been impossible to collectively control all or a part of the call states on the mobile terminal device 100.

SUMMARY OF THE INVENTION

It is therefore an object of the present invention to provide a mobile communication system which is capable of supporting multiple simultaneous communications on a single mobile terminal device, without causing a problem of the unnecessary paging operation by the network device in response to the subsequent call while being in a state of already ascertained the channel connection target from the earlier communication.

It is another object of the present invention to provide a mobile communication system which is capable of collectively controlling all or a part of call states on a mobile terminal device.

According to one aspect of the present invention there is provided a mobile communication system, comprising: at least one mobile terminal device having: more than one mobile terminal side call control units for controlling calls at a mobile terminal side; and a mobile terminal side mobile terminal management unit for managing a communication state of the mobile terminal device while identifying each mobile terminal side call control unit which is currently in communication; and a network device having: a plurality or network side call control units for controlling calls at a network side; and a network side mobile terminal management unit, provided in correspondence to the mobile terminal device, for managing the communication state of the mobile terminal device and correspondences between said plurality of network side call control units and the mobile terminal device while identifying each network side call control unit which is currently in communication.

Other features and advantages of the present invention will become apparent from the following description taken in conjunction with the accompanying drawings.

DETAILED DESCRIPTION OF THE PREFERRED EMBODIMENTS

Referring now to FIG. 2 to FIG. 11, one embodiment of a mobile communication system according to the present invention will be described in detail.

Figure 1:
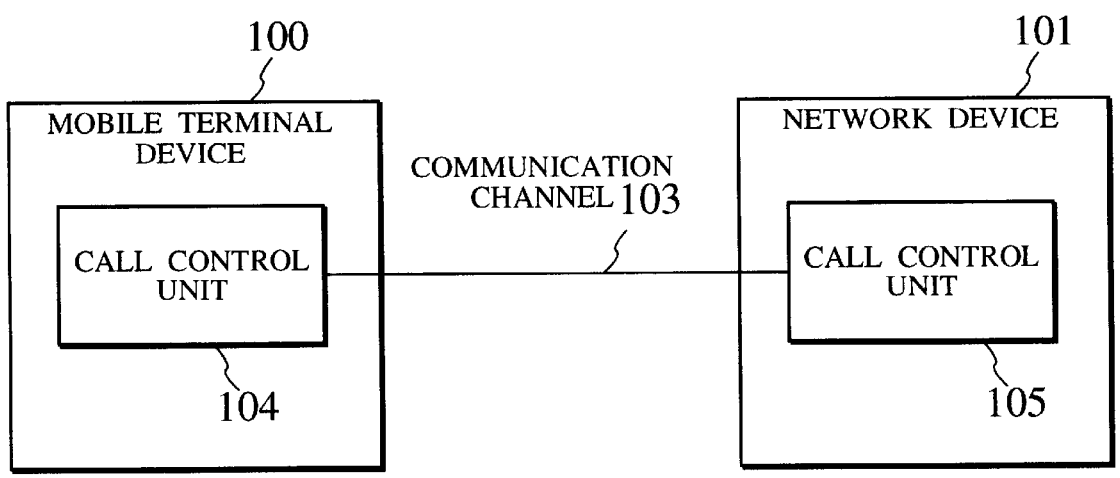
FIG. 1 is a block diagram of a schematic configuration of a conventional mobile communication system.
Figure 2:
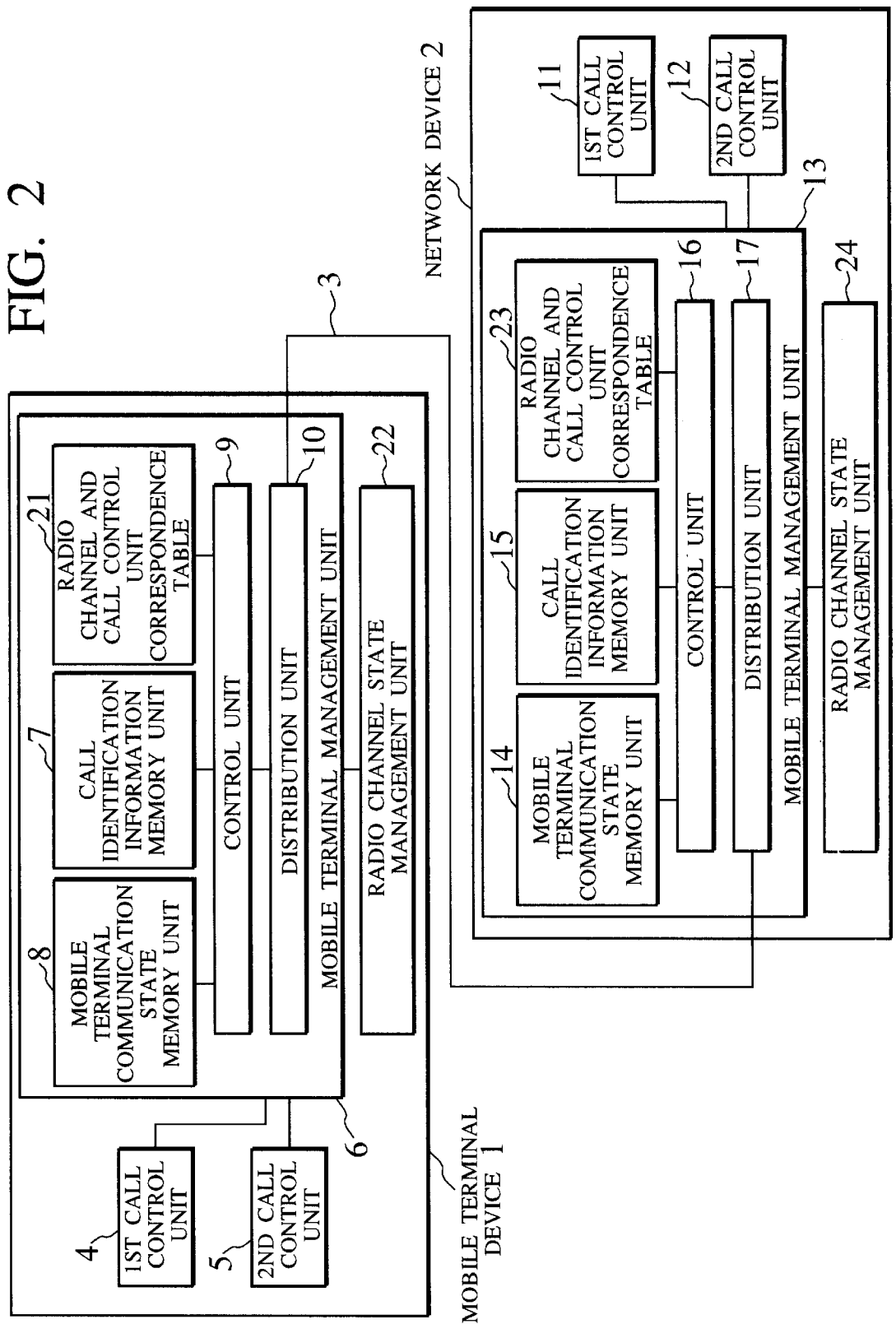
FIG. 2 is a block diagram of an exemplary configuration of a mobile communication system according to the present invention.

FIG. 2 shows an exemplary configuration of the mobile communication system according to the present invention, which generally comprises a mobile terminal device 1 and a network device 2 which are connected through a communication channel 3.

The mobile terminal device 1 has: first and second mobile terminal side call control units 4 and 5 which are provided in correspondence to first and second call identification numbers (ID1 and ID2); a mobile terminal side mobile terminal management unit 6 connected with the first and second mobile terminal side call control units 4 and 5 and the communication channel 3; and a mobile terminal side radio channel state management unit 22 connected with the mobile terminal side mobile terminal management unit 6.

The mobile terminal side mobile terminal management unit 6 further includes: a call identification information memory unit 7; a mobile terminal communication state memory unit 8; a radio channel and call control unit correspondence table 21; a control unit 9 for updating information contents of the call identification information memory unit 7, the mobile terminal communication state memory 8 and the radio channel and call control unit correspondence table 21; and a distribution unit 10 for distributing call control signals to the first and second call control units 4 and 5.

The network device 2 has: first and second network side call control units 11 and 12 which are provided in correspondence to first and second call identification numbers (ID1 and ID2); a network side mobile terminal management unit 13 connected with the first and second network side call control units 11 and 12 and the communication channel 3; and a network side radio channel state management unit 24 connected with the network side mobile terminal management unit 13.

The network side mobile terminal management unit 13 further includes: a call identification information memory unit 15; a mobile terminal communication state memory unit 14; a radio channel and call control unit correspondence table 23; a control unit 16 for updating information contents of the call identification information memory unit 15, the mobile terminal communication state memory 14 and the radio channel and call control unit correspondence table 23; and a distribution unit 17 for distributing call control signals to the first and second call control units 11 and 12.

Note here that FIG. 2 shows a simple exemplary case of using-two call control units in each or the mobile terminal device 1 and the network device 2, but it is also possible to provide more than two call control units in each of the mobile terminal device 1 and the network device 2 in general.

Note also that FIG. 2 shows only one mobile terminal device 1 for the sake of simplicity, but more than one mobile terminal devices similar to the mobile terminal device 1 of FIG. 2 may be provided in the mobile communication system in general. In such a general case, the network device 2 provides one network side mobile terminal management unit with respect to each mobile terminal device in a communication state, and more than one network side mobile terminal management units are realized as independent functions on a computer system constituting the network device 2. Also, in such a general case, each network side call control unit is not fixedly used with respect to one mobile terminal device, and any available network side call control unit can be used with respect to any one of the more than one network side mobile terminal management units.

In the mobile communication system of FIG. 2, the first and second mobile terminal side call control units 4 and 5 provided in the mobile terminal device 1 carry out communications with the mobile terminal side mobile terminal management unit 6 provided in the mobile terminal device 1, while also carrying out communications with the first and second network side call control units 11 and 12 and the network side mobile terminal management unit 13 provided in the network device 2.

Also, the first and second network side call control units 11 and 12 provided in the network device 2 carry out communications with the network side mobile terminal management unit 13 provided in the network device 2, while also carrying out communications with the first and second mobile terminal side call control units 4 and 5 and the mobile terminal side mobile terminal management unit 6 provided in the mobile terminal device 1.

In addition, the mobile terminal side mobile terminal management unit 6 and the network side mobile terminal management unit 13 carry out communications with each other.

Each signal used for the communications among the first and second mobile terminal side call control units 4 and 5 and the first and second network side call control units 11 and 12 is attached with a call identification number for identifying the call control unit which originated each signal. In the mobile terminal side mobile terminal management unit 6 and the network side mobile terminal management unit 13, the respective control units 9 and 16 store all the currently used call identification numbers in the respective call identification information memory units 7 and 15, in order to collectively control all or a part of call states on the mobile terminal device 1 as will be described in detail below.

Here, the communications among the first and second mobile terminal side call control units 4 and 5 and the first and second network side call control units 11 and 12 can be carried out only when the information contents in the respective mobile terminal communication state memory units 8 and 14 are "active", and otherwise a communication signal transmitted from the call control unit 4, 5. 11 or 12 will be judged as "abnormal" and discarded by the corresponding control unit 9 or 16.

Note that each mobile terminal communication state memory unit 8 or 14 stores information indicating a state of the corresponding mobile terminal management unit as an "active" state, a "waiting for response" state, or an "idle" state.

Now, the operations of this mobile communication system of FIG. 2 for various cases will be described in detail case by case.

Figure 3:
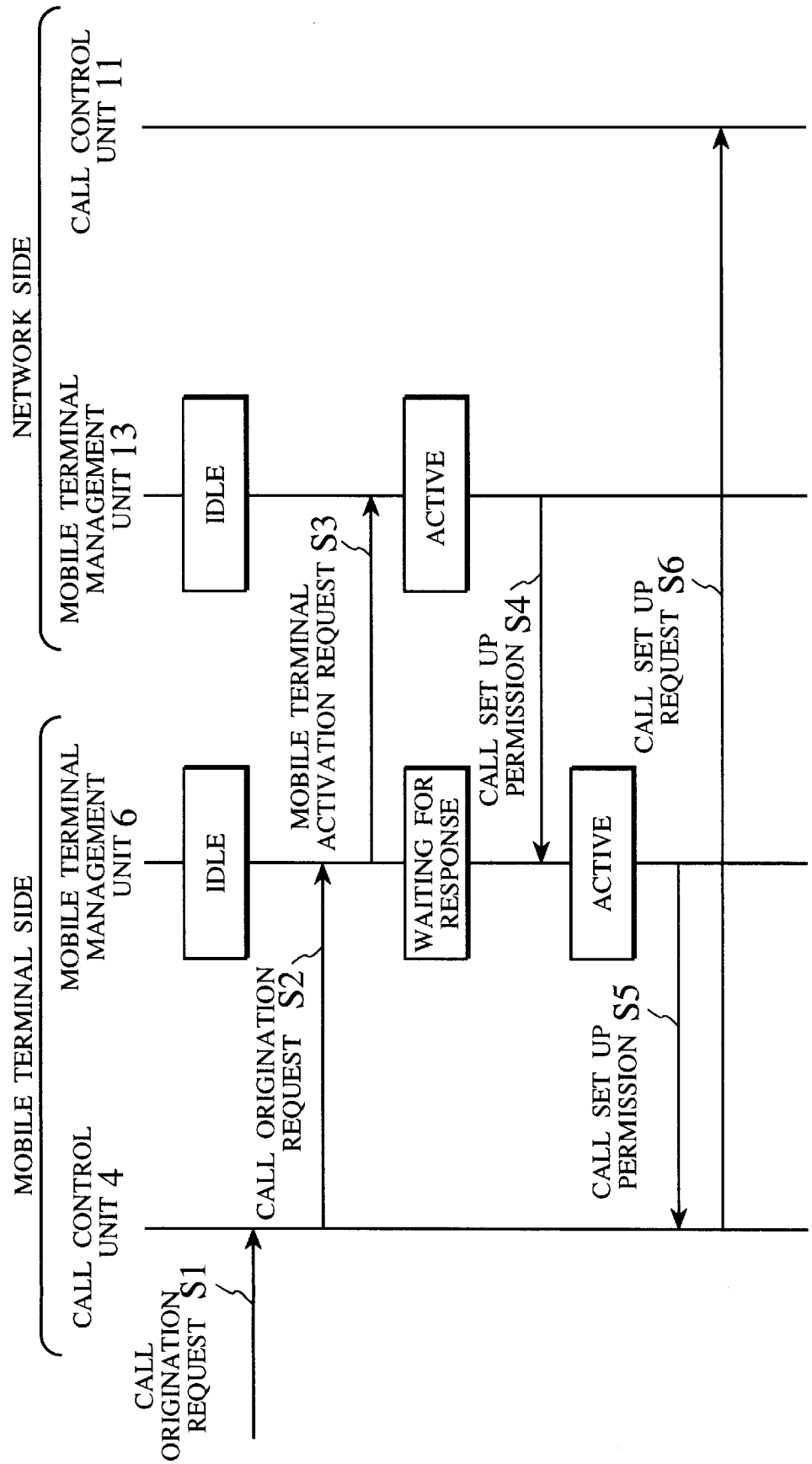
FIG. 3 is a sequence chart of a procedure for originating a call while there is no call on a mobile terminal device in the system of FIG. 2.

First, a procedure for originating a call when a user requested a call origination while there is no call on the mobile terminal device 1 is carried out according to a sequence chart of FIG. 3 as follows.

When a user makes a call origination request by using the first mobile terminal side call control unit 4 (S1). for example, this first mobile terminal side call control unit 4 transmits a call origination request signal to the mobile terminal side mobile terminal management unit 6 in the mobile terminal device 1 (S2).

The mobile terminal side mobile terminal management unit 6 then Judges that the current state is an "idle" state, forms a mobile terminal activation request signal for changing the state of the network side mobile terminal management unit 13 into an "active" state, and transmits this mobile terminal activation request signal to the network side mobile terminal management unit 13 through the communication channel 3 (S3). After this mobile terminal activation request signal is transmitted, the state of the mobile terminal side mobile terminal management unit 6 is changed into a "waiting for response" state.

When the mobile terminal activation request signal is received, the network side mobile terminal management unit changes its state into an "active" state, and returns a call set up permission signal to the mobile terminal side mobile terminal management unit 6 (S4). When this call set up permission signal is received, the mobile terminal side mobile terminal management unit 6 changes its state from a "waiting for response" state to an "active" state, and transmits this call set up permission signal to the first mobile terminal side call control unit 4 (S5).

Note here that the user made the call origination request by using the first mobile terminal side call control unit 4 in this case, so that the mobile terminal side mobile terminal management unit 6 transmitted the call set up permission signal to the first mobile terminal side call control unit 4, but when the user makes the call origination request by using the second mobile terminal side call control unit 5, the mobile terminal side mobile terminal management unit 6 will transmit the call set up permission signal to the second mobile terminal side call control unit 5.

When the call set up permission signal is received, the first mobile terminal side call control unit 4 transmits a call set up request signal to the first network side call control unit 11 (S6). Then, the first network side call control unit 11 will carry out a call set up in response to the received call set up request from the first mobile terminal side call control unit 4.

Next, a procedure for originating a call while a call already exists on the mobile terminal device 1 is carried out according to a sequence chart of FIG. 4 as follows.

When a user makes a call origination request to the mobile terminal device 1 (S11), the second mobile terminal side call control unit 5 forms a call origination request signal and transmits this call origination request signal to the mobile terminal side mobile terminal management unit 6 in the mobile terminal device 1 (S12).

In this case, a call already exists on the mobile terminal device 1, so that the mobile terminal side mobile terminal management unit 6 judges that the current state at a time of receiving this call origination request signal is an "active" state, and transmits a call set up permission signal to the second mobile terminal side call control unit 5 from which a call set up is requested by the user (S13).

When this call set up permission signal is received, the second mobile terminal side call control unit 5 forms a call set up request signal and transmits this call set up request signal to the second network side call control unit 12 in the network device 2 (S14). Then, the second network side call control unit 12 will carry out a call set up in response to the received call set up request from the second mobile terminal side call control unit 5.

Figure 4:
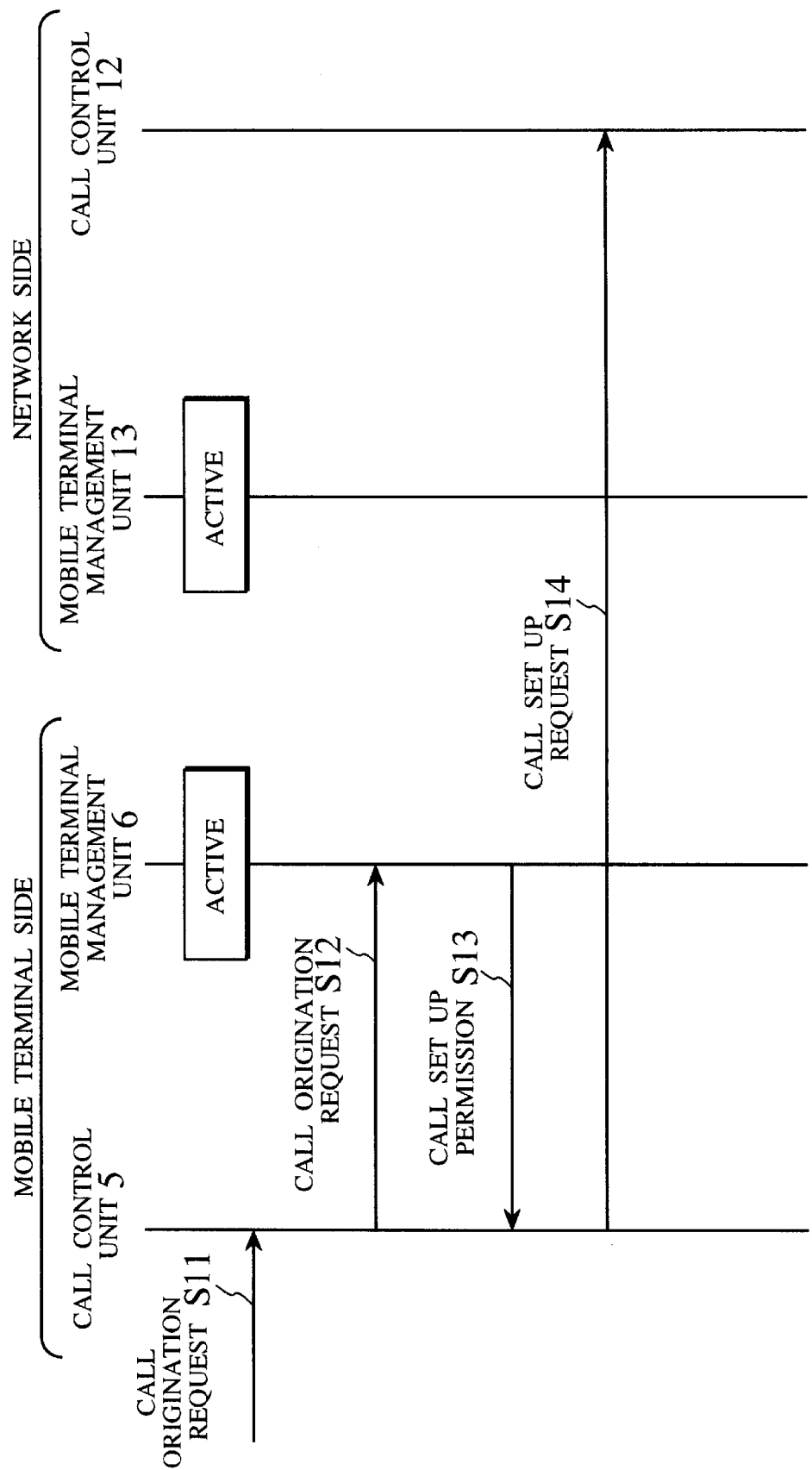
FIG. 4 is a sequence chart of a procedure for originating a call while a call already exists on a mobile terminal device in the system of FIG. 2.

Note that, according to this call origination procedure of FIG. 4, the mobile terminal side mobile terminal management unit 6 has been recognizing that the communication is already carried out between the mobile terminal and the mobile communication network at a time of originating a second or subsequent call, so that there is no need to use an access using a common channel from the mobile terminal to the network as well as a channel set up procedure for the purpose of the control signal transfer between the mobile terminal and the mobile communication network. Consequently, it is possible to shorten a communication set up time and reduce an amount of the control signal.

Figure 5:
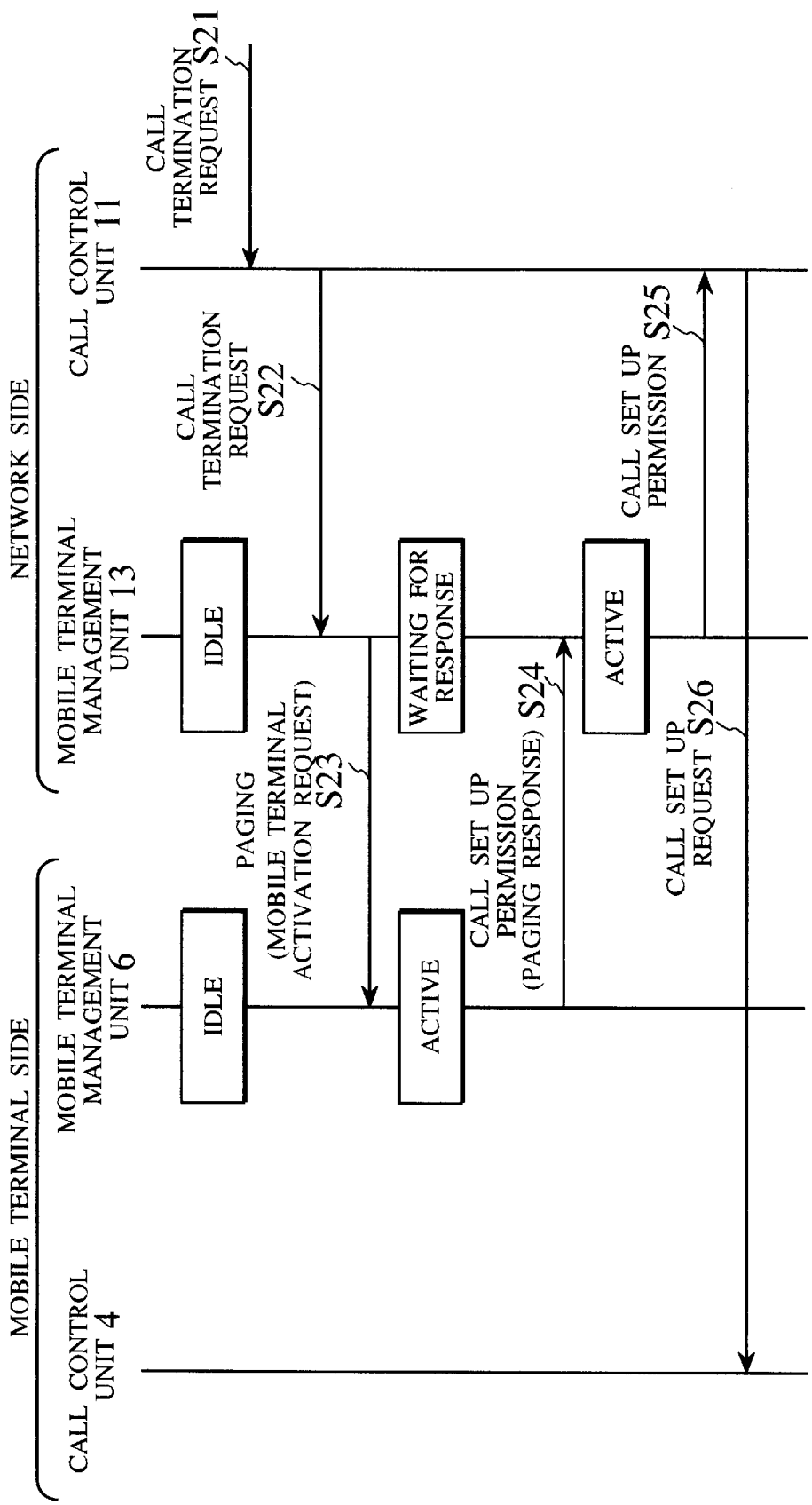
FIG. 5 is a sequence chart of a procedure for terminating a call while there is no call on a mobile terminal device in the system of FIG. 2.

Next, a procedure for terminating a call while there is no call on the mobile terminal device 1 is carried out according to a sequence chart of FIG. 5 as follows.

When the first network side call control unit 11 receives a call terminal request signal (S21), for example, the first network side call control unit 11 transmits this call termination request signal to the network side mobile terminal management unit 13 (S22).

In this case, there is no call on the mobile terminal device 1, so that when the call termination request signal is received, the network side mobile terminal management unit 13 judges that the current state is an "idle" state, and transmits a paging signal (a mobile terminal activation request signal) to the mobile terminal side mobile terminal management unit 6 (S23). After this paging signal is transmitted, the state of the network side mobile terminal management unit 13 is changed into a "waiting for response" state.

When the paging signal is received, the mobile terminal side mobile terminal management unit 6 changes its state into an "active" state, and returns a call set up permission signal (a paging response signal) to the network side mobile terminal management unit 13 (S24).

When this call set up permission signal is received, the network side mobile terminal management unit 13 changes its state into an "active" state, and transmits this call set up permission signal to the first network side call control unit 11 which received the call termination request signal (S25).

When this call set up permission signal is received, the first network side call control unit 11 transmits a call set up request signal to the first mobile terminal side call control unit 4 (S26). Then, a call control will be carried out between the first mobile terminal side call control unit 4 and the first network side call control unit 11.

Figure 6:
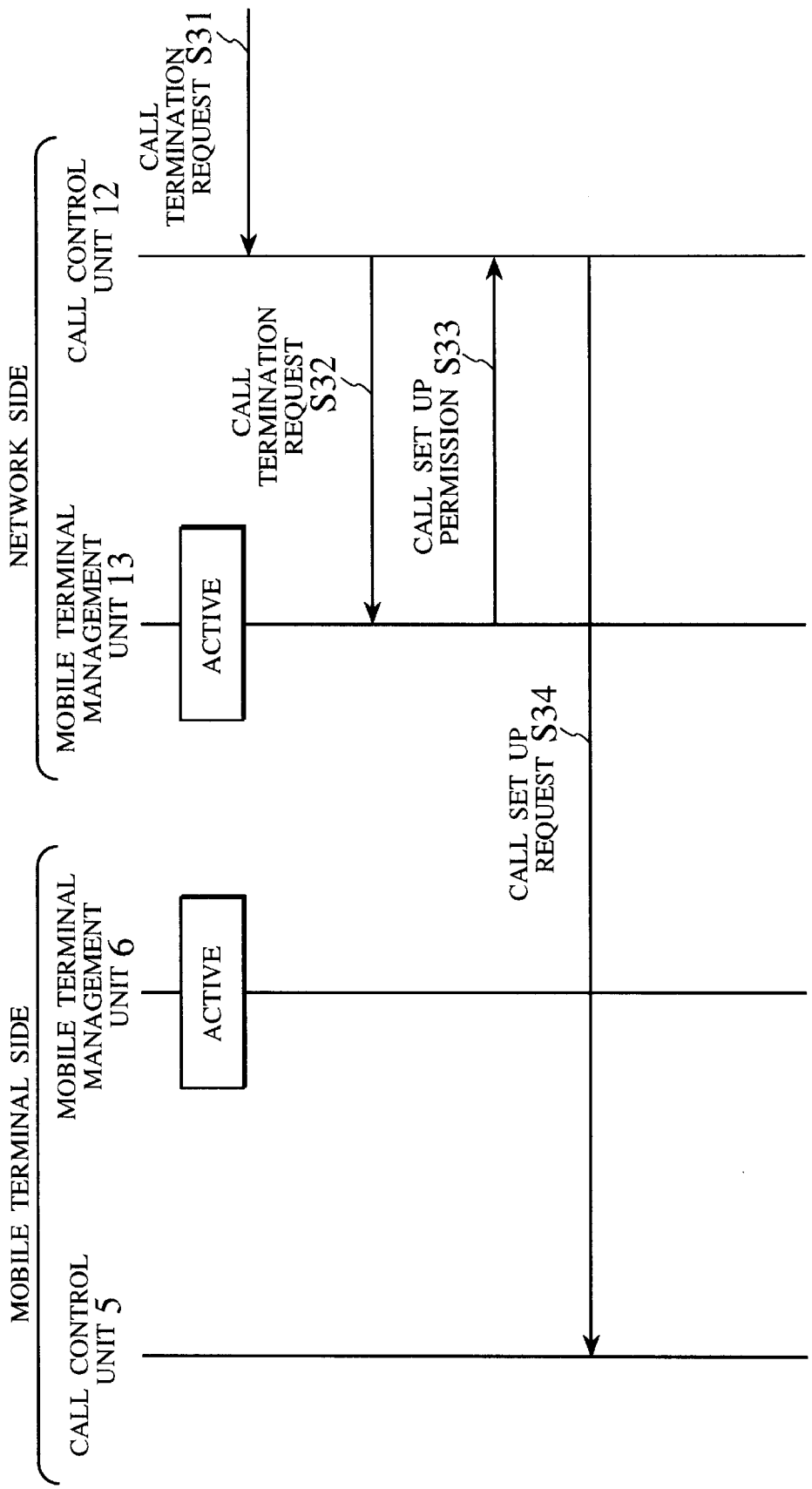
FIG. 6 is a sequence chart of a procedure for terminating a call while a call already exists on a mobile terminal device in the system of FIG. 2.

Next, a procedure for terminating a call while a call already exists on the mobile terminal device 1 is carried out according to a sequence chart of FIG. 6 as follows.

When the second network side call control unit 12 receives a call terminal request signal (S31), for example. this second network side call control unit 12 transmits the call termination request signal to the network side mobile terminal management unit 13 (S32).

In this case, a call already exists on the mobile terminal device 1, so that when the call termination request signal is received, the network side mobile terminal management unit 13 judges that the current state is an "active" state, and transmits a call set up permission signal to the second network side call control unit 12 which received the call termination request signal (S33).

When the call set up permission signal is received, the second network side call control unit 12 transmits a call set up request signal to the second mobile terminal side call control unit 5, for example (S34). Then, a call control will be carried out between the second mobile terminal side call control unit 5 and the second network side call control unit 12.

Note here that, in the exemplary call termination procedures described above, it is assumed that the first or second network side call control unit 11 or 12 which received the call termination request signal is capable of carrying out the direct communication with the network side mobile terminal management unit 13, but there can also be cases in which the first or second network side call control unit 11 or 12 is not capable of identifying the network side mobile terminal management unit 13 when there are more than one network side mobile terminal management units in correspondence to more than one mobile terminal devices.

In such a case, it is also possible to provide a correspondence table between the first or second network side call control unit 11 or 12 and the network side mobile terminal management unit 13 as a separate function for enabling the communication between the first or second network side call control unit 11 or 12 and the network side mobile terminal management unit 13 in a manner described above.

Now, in order to manage the communications on the mobile terminal device 1 which has a plurality of call control units 4 and 5, it is necessary for the mobile terminal management units 6 and 13 to be capable of identifying each of the call control units 4 and 5 and managing activation and releasing of each of the call control units 4 and 5 according to a result of this identification. To this end, each of the mobile terminal management unit 6 and 13 in the mobile communication system of FIG. 2 recognizes and manages every signal between the call-control units.

Figure 7:
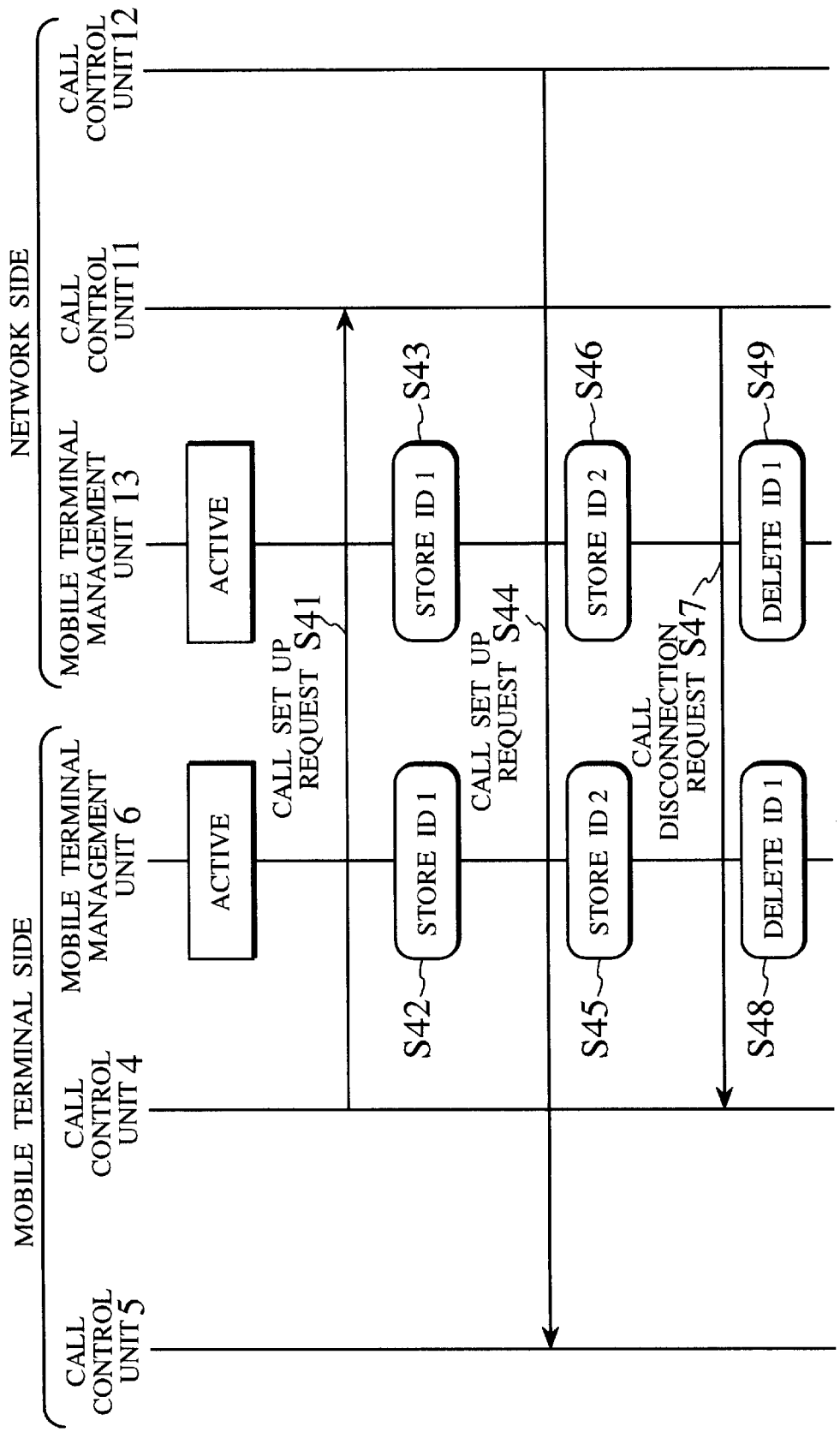
FIG. 7 is a sequence chart of one exemplary procedure for call origination and disconnection in the system of FIG. 2.

More specifically, a procedure for call origination and disconnection in a case of recognizing and managing every signal between the call control units at each mobile terminal management unit 6 or 13 is carried out according to a sequence chart of FIG. 7 as follows.

At a time of call origination request as described above, when the call set up request signal is transmitted from the first mobile terminal side call control unit 4 in the mobile terminal device 1 to the first network side call control unit 11 in the network device 2 (S41), the mobile terminal management units 6 and 13 in the respective devices 1 and 2 detect this call set up request signal, and store the call identification number ID1 of the first mobile terminal side call control unit 4 in the respective call identification information memory unit 7 and 15 (S42, S43).

Also, at a time of call termination request as described above, when the call set up request signal is transmitted from the second network side call control unit 12 in the network device 2 to the second mobile terminal side call control unit 5 in the mobile terminal device 1 (S44), the mobile terminal management units 8 and 13 in the respective devices 1 and 2 detect this call set up request signal, and store the call identification number ID2 of the second network side call control unit 12 in the respective call identification information memory unit 7 and 15 (S45, S46).

Then, when the communication of the first network side call control unit 11 is finished, for example, a call disconnection request signal is transmitted from the network side call control unit 11 to the mobile terminal side call control unit 4 (S47), and the mobile terminal management units 6 and 13 in the respective devices 1 and 2 detect this call disconnection request signal, and delete the-call identification number ID1 corresponding to this call disconnection request signal from the respective call identification information memory units 7 and 15 (S48. S49).

In this manner, the mobile terminal management unit 6 and 13 in the mobile communication system of FIG. 2 can manage a plurality of communication states on the mobile terminal device 1 by storing, or deleting the corresponding call identification number in the respective call identification information memory units 7 and 15 according to the call control unit which originated the call set up request signal.

It is also possible to manage a plurality of communication states on the mobile terminal device 1 by transmitting the call identification number from the call control unit to the mobile terminal management unit, and then carrying out the call control activation and the call control releasing.

Figure 8:
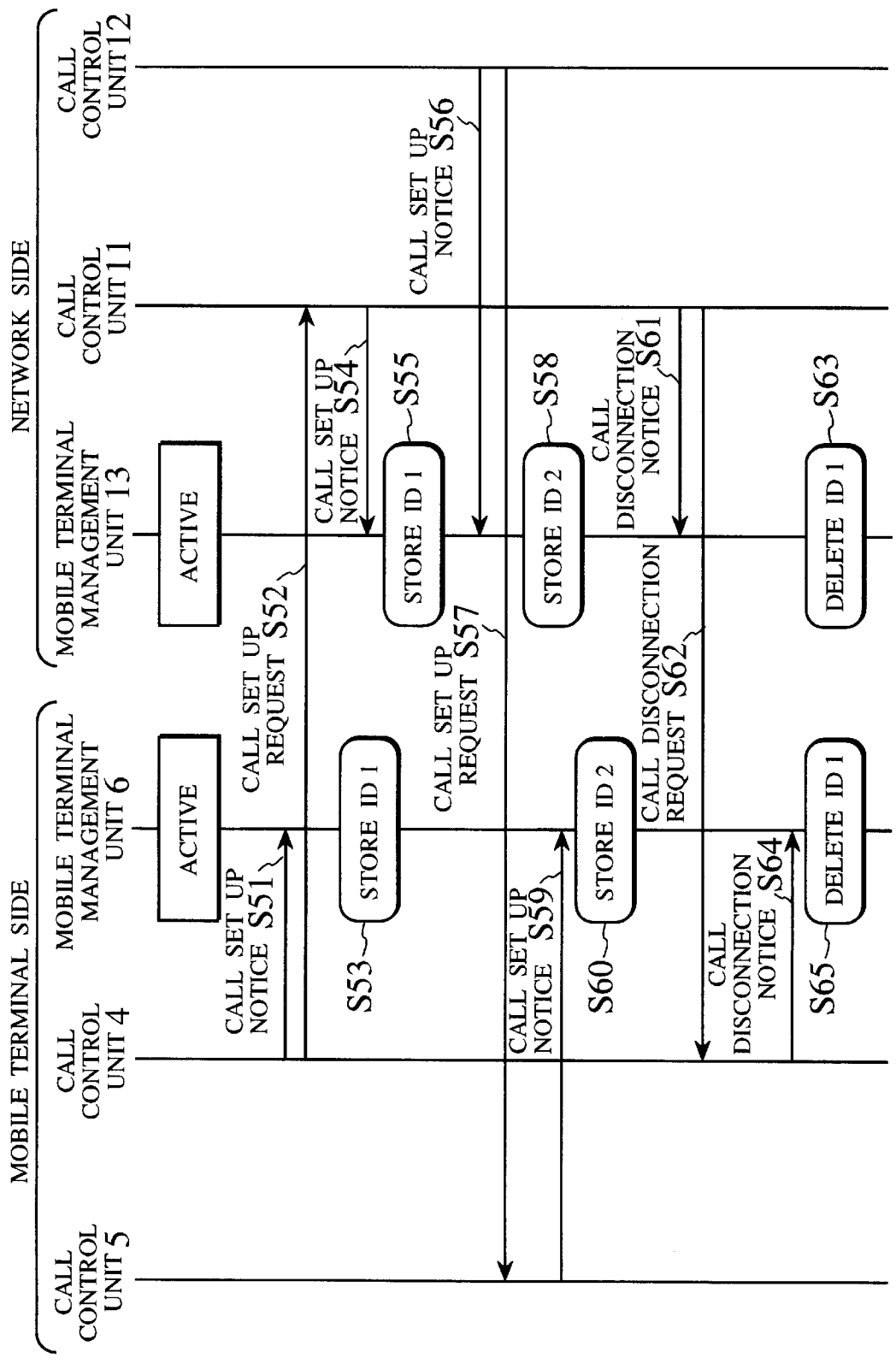
FIG. 8 is a sequence chart of another exemplary procedure for call origination and disconnection in the system of FIG. 2.

In this case, a procedure for call origination and disconnection is carried out according to a sequence chart of FIG. 8 as follows.

At a time of call origination request as described above, when the call set up permission signal from the mobile terminal side mobile terminal management unit 6 is received at the first mobile terminal side call control unit 4 which had received the call origination request signal from the user, for example, this first mobile terminal side call control unit 4 transmits the call set up request signal to the first network side call control unit 11 (S52) while also transmitting a call set up notice signal containing the call identification number ID1 corresponding to this first mobile terminal side call control unit 4 to the mobile terminal side mobile terminal management unit 6 (S51). When this call set up notice signal is received, the mobile terminal side mobile terminal management unit 6 stores the call identification number ID1 transmitted along this call set up notice signal in the call identification information memory unit 7 (S53).

Also, when the call set up request signal is received from the mobile terminal side call control unit 4, the first network side call control unit 11 transmits a call set up notice signal containing the call identification number ID1 corresponding to this first network side call control unit 11 to the network side mobile terminal management unit 13 (S54). When this call set up notice signal is received, the network side mobile terminal management unit 13 stores the call identification number ID1 transmitted along this call set up notice signal in the call identification information memory unit 15 (S55).

Then, at a time of call termination request as described above, when the call set up request signal is transmitted from the second network side call control unit 12 in the network device 2 to the second mobile terminal side call control unit 5 in the mobile terminal device 1 (S57), this second network side call control unit 12 also transmits a call set up notice signal containing the call identification number ID2 corresponding to this second network side call control unit 12 to the network side mobile terminal management unit 13 (S56). When this call set up notice signal is received, the network side mobile terminal management unit 13 stores the call identification number ID2 transmitted along with this call set up notice signal in the call identification information memory unit 15 (S58).

Also, when the call set up request signal is received from the network side call control unit 12, the mobile terminal side call control unit 5 transmits a call set up notice signal containing the call identification number ID2 corresponding to this second mobile terminal side call control unit 5 to the mobile terminal side mobile terminal management unit 6 (S59). When this call set up notice signal is received, the mobile terminal side mobile terminal management unit 6 stores the call identification number ID2 transmitted along with this call set up notice signal in the call identification information memory unit 7 (S60).

Then, when the communication of the first network side call control unit 11 is finished, for example, the network side call control unit 11 transmits a call disconnection request signal to the mobile terminal side call control unit 4 (S62), while also transmitting a call disconnection notice signal to the network side mobile terminal management unit 13 (S61). When this call disconnection notice signal is received, the network side mobile terminal management unit 13 deletes the call identification number ID1 corresponding to this call disconnection notice signal from the call identification information memory unit 15 (S63).

Also, when the call disconnection request signal from the network side call control unit 11 is received, the mobile terminal side call control unit 4 transmits a call disconnection notice signal to the mobile terminal side mobile terminal management unit 6 (S64). When this call disconnection notice signal is received, the mobile terminal side mobile terminal management unit 6 deletes the call identification number ID1 corresponding to this call disconnection notice signal from the call identification information memory unit 7 (565).

In this manner, the mobile terminal management unit 6 and 13 in the mobile communication system of FIG. 2 can manage a plurality of communication states on the mobile terminal device 1 similarly as in a case of recognizing and managing every signal between the call control units.

Note here that, in a general case where the mobile communication system has more than one mobile terminal device, the network side mobile terminal management unit 13 manages the correspondence between each mobile terminal device and the network side call control units used with respect to that mobile terminal device as follows.

Namely, in a case of adopting a provision to set up a separate control channel for each mobile terminal at a time of communication set up for the first call on that mobile terminal, it is possible for the network side mobile terminal management unit 13 to recognize a mobile terminal corresponding to each received call control signal according to a separate control channel from which that call control signal is physically received.

On the other hand, in a case of adopting a provision to use a common control channel for all mobile terminals, upon receiving a signal from the mobile terminal side call control unit, the mobile terminal side mobile terminal management unit attaches a terminal identification information for identifying the own mobile terminal to this signal and then transmits this signal to the network side mobile terminal management unit. Then, at the network device, the received signal is transferred to one network side mobile terminal management unit corresponding to that mobile terminal according to the terminal identification information attached to the received signal. In this case. it is necessary for the network device to be provided with a function for distributing the received signals to the corresponding network side mobile terminal management units according to the terminal identification information.

Alternatively, in a case of adopting a provision to use a common control channel for all mobile terminals, it is also possible to include the terminal identification information in the call identification information described above, so that the network side mobile terminal management unit can manage the correspondence between the mobile terminal and the network side call control units according to the terminal identification information contained in the call identification information.

In either case, the concrete examples of the terminal identification includes:

(1) information which is unique to each mobile terminal such as a mobile terminal ID, and (2) a number temporarily assigned to each mobile terminal at the network device at a time of receiving an initial terminal access request signal from each mobile terminal, which is valid only while the state of the corresponding mobile terminal management unit is an "active" state.

Now, in the mobile communication system of FIG. 2, all or a part of call states on the mobile terminal device 1 are collectively controlled according to the call identification information stored in the call identification information memory units 7 and 15, and a procedure for this collective control is carried out according to a sequence chart of FIG. 9 as follows.

Here, an exemplary case in which there arises a need to make a change (such as a communication ending) in the related call states due to the radio channel state degradation will be described.

In this case, the network side radio channel state management unit 24 detects the radio channel state degradation for all or a part of the radio channels on the mobile terminal device 1 (S71), and transmits a radio channel state degradation notice to the network side mobile terminal management unit 13 (S72). Then, the network side mobile terminal management unit 13 determines the call control units which are related to the notified degraded radio channels, according to the received radio channel state degradation notice and the radio channel and call control unit correspondence table 23 provided in the network side mobile terminal management unit 13 (S73), and carries out the following collective control of the determined call control units.

Namely, when there is a radio channel state degradation in a radio channel established between the first mobile terminal side call control unit 4 and the first network side call control unit 11, the network side mobile terminal management unit 13 transmits a state change request signal to the first network side call control unit 11 (S74). At the same time, when there is also a radio channel state degradation in a radio channel established between the second mobile terminal side call control unit 5 and the second network side call control unit 12, the network side mobile terminal management unit 13 also transmits a state change request signal to the second network side call control unit 12 (S75).

In response to the state change request signal from the network side mobile terminal management unit 13, the first network side call control unit 11 transmits a state change request signal indicating this state change request to the first mobile terminal side call control unit 4 (S76), while the second network side call control unit 12 transmits a state change request signal indicating this state change request to the second mobile terminal side call control unit 5 (S77).

Then, when the state change request signal from the first network side call control unit 11 is received, the first mobile terminal side call control unit 4 returns a state change response signal indicating a reception of the state change request signal to the first network side call control unit 11 (S78). Also, when the state change request signal from the second network side call control unit 12 is received, the second mobile terminal side call control unit 5 returns a state change response signal indicating a reception of the state change request signal to the second network side call control unit 12 (S79).

Then, when the state change response signal from the first mobile terminal side call control unit 4 is received, the first network side call control unit 11 returns a state change response signal indicating a reception of this state change response to the network side mobile terminal management unit 13 (S80). Also, when the state change response signal from the second mobile terminal side call control unit 5 is received, the second network side call control unit 12 returns a state change response signal indicating a reception of this state change response to the network side mobile terminal management unit 13 (S81).

In this manner, in the mobile communication system of FIG. 2, the transmission and reception of the state change request signals and the state change response signals are carried out through the network side mobile terminal management unit 13, between the first network side call control unit 11 and the first mobile terminal side call control unit 4 as well as between the second network side call control unit 12 and the second mobile terminal side call control unit 5. Consequently. It becomes possible to activate the call control units 4, 5, 11 and 12 simultaneously, and it becomes possible to collectively control all or a part of the call control units 4 and 5 on the mobile terminal device 1.

After this collective control procedure, each of the activated call control units 4. 5, 11 and 12 subsequently carries out the call disconnection procedure.

Figure 9:
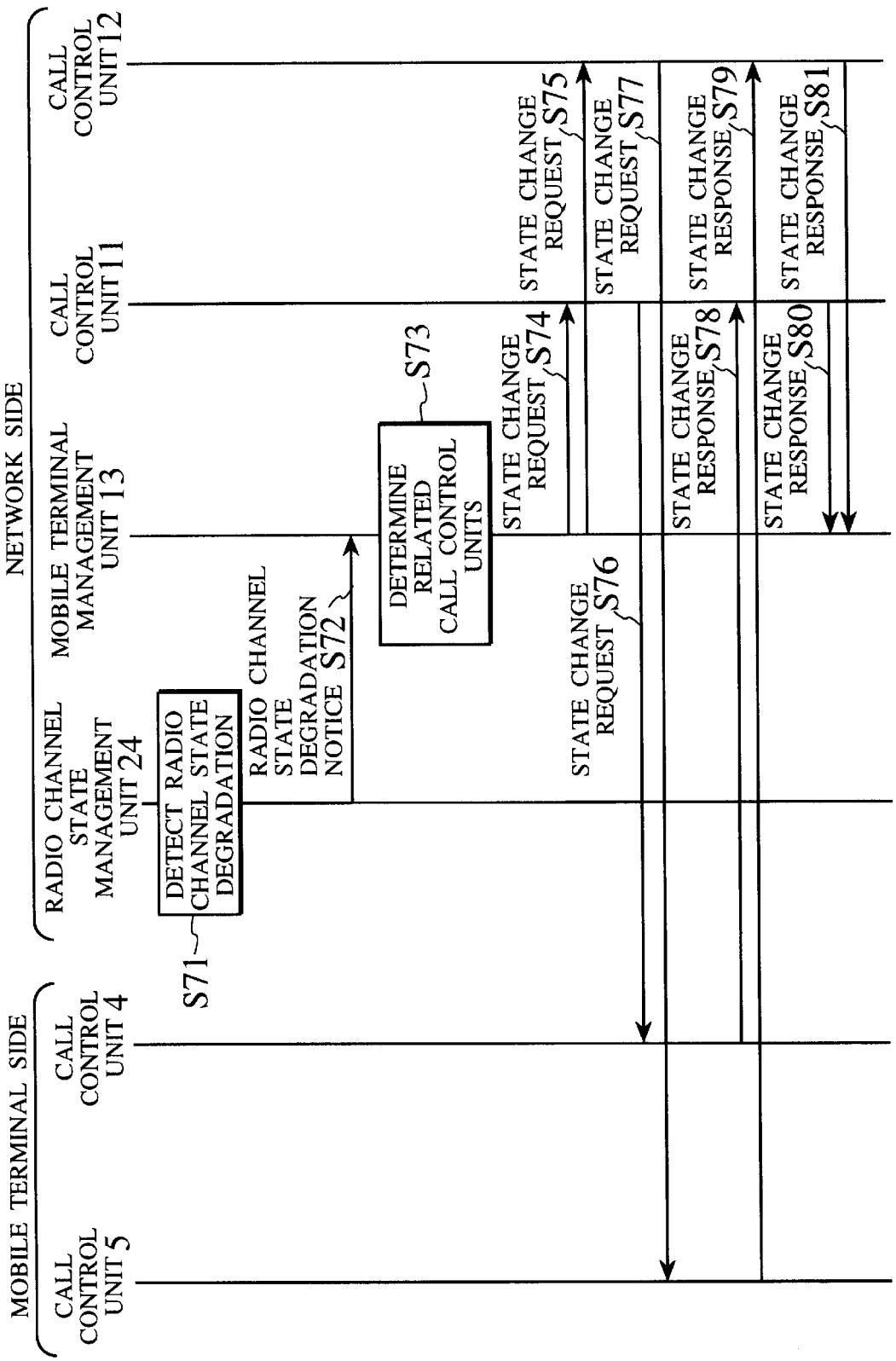
FIG. 9 is a sequence chart of a procedure for collectively controlling all or a part of call states on a mobile terminal device in the system of FIG. 2.

Note that the procedure for collective control shown in FIG. 9 is for the collective control initiated at the network device 2 side, but the collective control initiated at the mobile terminal device 1 side can also be carried out by the similar procedure using the mobile terminal side mobile terminal management unit 6 and the mobile terminal side radio channel state management unit 22.

Note also that, in a case where there are more than one calls, when there arises a need to disconnect (or switch) all or a part of the radio channels currently used for communications on the mobile terminal device 1 due to the radio channel state degradation, as in a case of the soft handover, it is possible to specify the radio channel control for the radio channels corresponding to more than one calls by a single radio channel control signal instead of issuing a radio channel control signal for the radio channel corresponding to each call separately.

In this case, a procedure for radio channel control is carried out according to a sequence chart of FIG. 10 as follows.

Namely, in this case, the network side radio channel state management unit 24 detects the radio channel state degradation for all or a Part of the radio channels on the mobile terminal device 1 (S91), and transmits a radio channel state degradation notice to the network side mobile terminal management unit 13 (S92). Then, the network side mobile terminal management unit 13 determines all the radio channels which are related to the calls using the notified degraded radio channels and which are to be controlled simultaneously, according to the received radio channel state degradation notice and the radio channel and call control unit correspondence table 23 provided in the network side mobile terminal management unit 13 (S93).

Then, the network side mobile terminal management unit 13 transmits a single radio channel control signal having the same control message with respect to all the radio channels to be controlled simultaneously to the mobile terminal side mobile terminal management unit 6 (S94).

Note that the correspondence between the radio channels and the call control units is not necessarily the one-to-one correspondence, and can be the N-to-one or one-to-N correspondence. In a case of the one-to-one correspondence, there is no need to use the radio channel and call control unit correspondence table 23.

Figure 10:
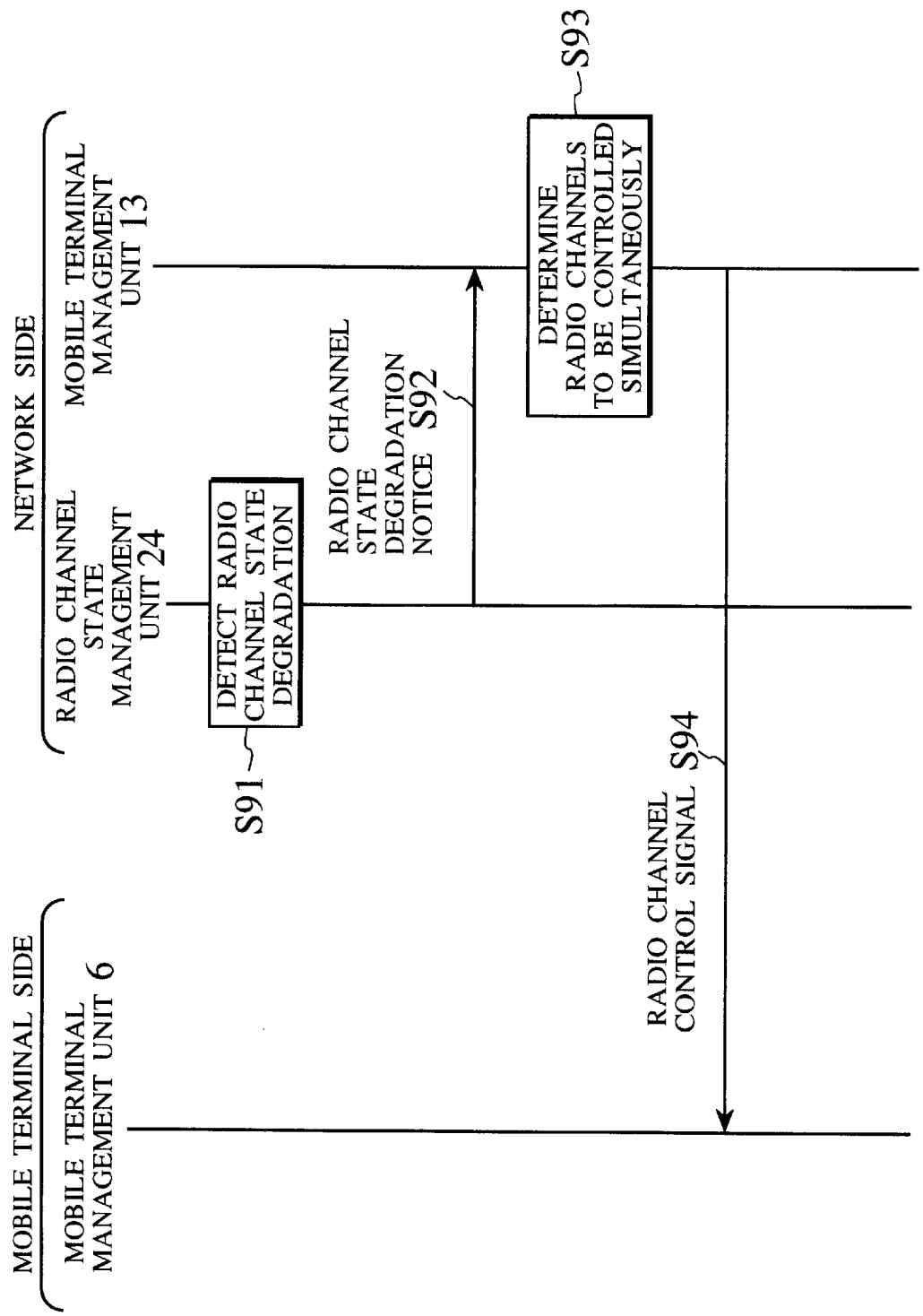
FIG. 10 is a sequence chart of a procedure for radio channel control using a single radio channel control signal in the system of FIG. 2.

Note also that the procedure for radio channel control shown in FIG. 10 is for the radio channel control initiated at the network device 2 side, but the radio channel control initiated at the mobile terminal device 1 side can also be carried out by the similar procedure using the mobile terminal side mobile terminal management unit 6 and the mobile terminal side radio channel state management unit 22.

Next, a procedure for call disconnection on the network device 2 side is carried out according to a sequence chart of FIG. 11 as follows.

First, a call disconnection request signal is transmitted from the activated first mobile terminal side call control unit 4 to the activated first network side call control unit 11 (S101). When this call disconnection request signal is received, the first network side call control unit 11 executes the call disconnection, and transmits a call disconnection completion signal to the first mobile terminal side call control unit 4 at a timing of a completion of the call disconnection (S102). When the call disconnection is completed, the control units 9 and 16 of the respective mobile terminal management units 6 and 13 delete the call identification number ID1 corresponding to these call control units 4 and 11 from the respective call identification information memory units 7 and 15 by the procedure similar to that of FIG. 7 or FIG. 8 described above (S103, S104).

Similarly, a call disconnection request signal is transmitted from the activated second network side call control unit 12 to the activated second mobile terminal side call control unit 5 (S105). When this call disconnection request signal is received, the second mobile terminal side call control unit 5 executes the call disconnection, and transmits a call disconnection completion signal to the second network side call control unit 12 at a timing of a completion of the call disconnection (S108). When the call disconnection is completed, the control units 9 and 18 of the respective mobile terminal management units 6 and 13 delete the call identification number ID2 corresponding to these call control units 5 and 12 from the respective call identification information memory units 7 and 15 by the procedure similar to that of FIG. 7 or FIG. 8 described above (S109, S110).

Here, the control units 9 and 16 delete the call identification number stored in the respective call identification information memory units 7 and 15 every time the call disconnection is completed, but in addition, the network side mobile terminal management unit 13 judges whether the call identification number to be deleted next is for the last call or not, and when it is judged as the call identification number for the last call, that is, when the last call disconnection is detected (S106), the network side mobile terminal management unit 13 forms a mobile terminal release request signal for changing a state of the mobile terminal side mobile terminal management unit 6 into an "idle" state, and transmits this mobile terminal release request signal to the mobile terminal side mobile terminal management unit 6 (S107), while changing a state of this network side mobile terminal management device 13 itself into a "waiting for response" state.

When the mobile terminal release request signal is received, the control unit 9 of the mobile terminal side mobile terminal management unit 6 changes its state into an "idle" state, and transmits a mobile terminal release completion signal to the network side mobile terminal management unit 13 (S111). Then, when the mobile terminal release completion signal is received, the network side mobile terminal management unit 13 changes its state into an "idle" state.

Figure 11:
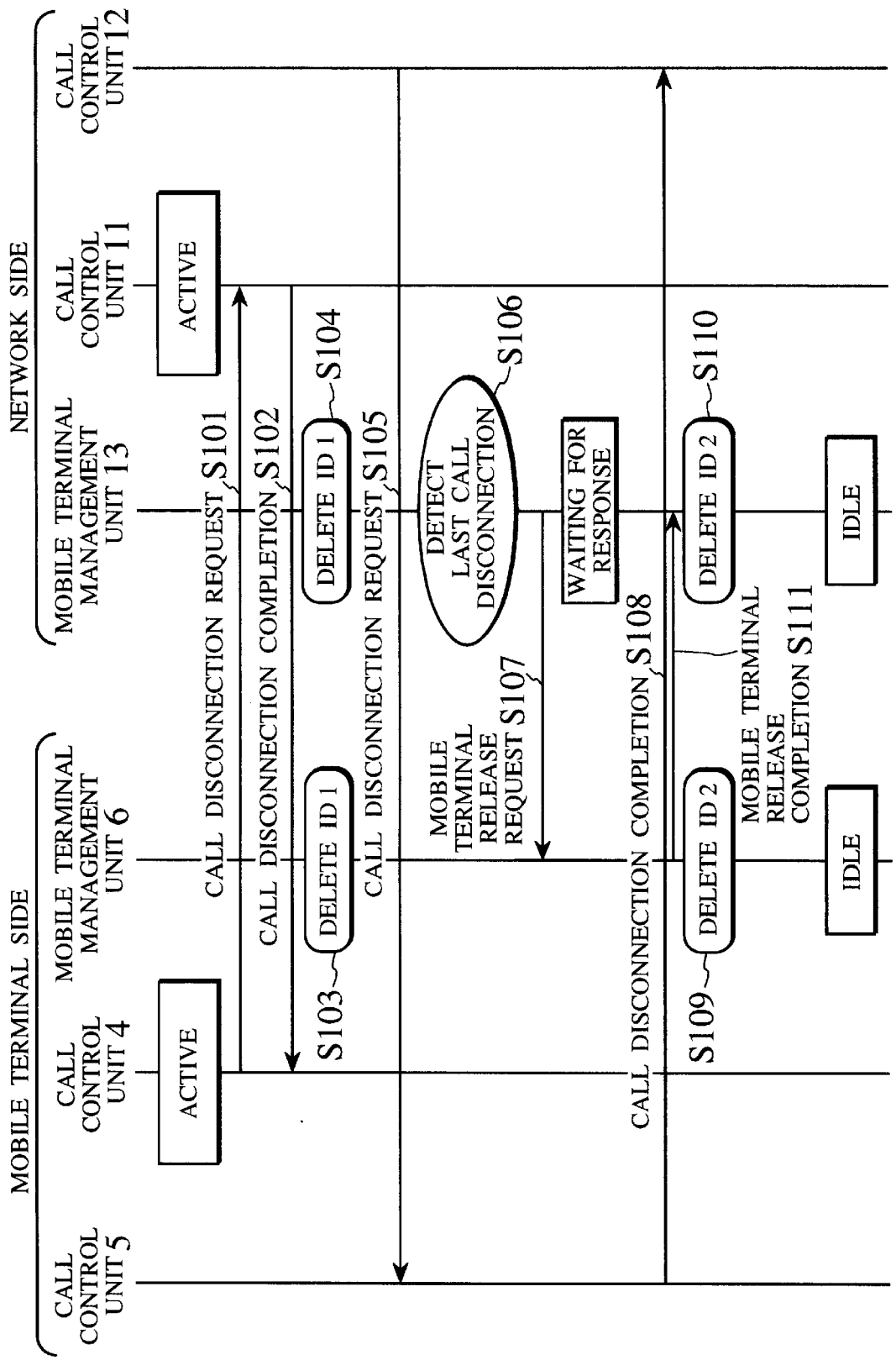
FIG. 11 is a sequence chart of a procedure for call disconnection on a network device side in the system of FIG. 2.

Note that FIG. 11 shows a case in which the mobile terminal release request signal and the mobile terminal release completion signal for the purpose of changing the states of the mobile terminal side mobile terminal management unit 6 and the network side mobile terminal management unit 13 into an "idle" state are to be transmitted simultaneously as the call disconnection request signal and the call disconnection completion signal for the last call disconnection respectively.

Figure 12:
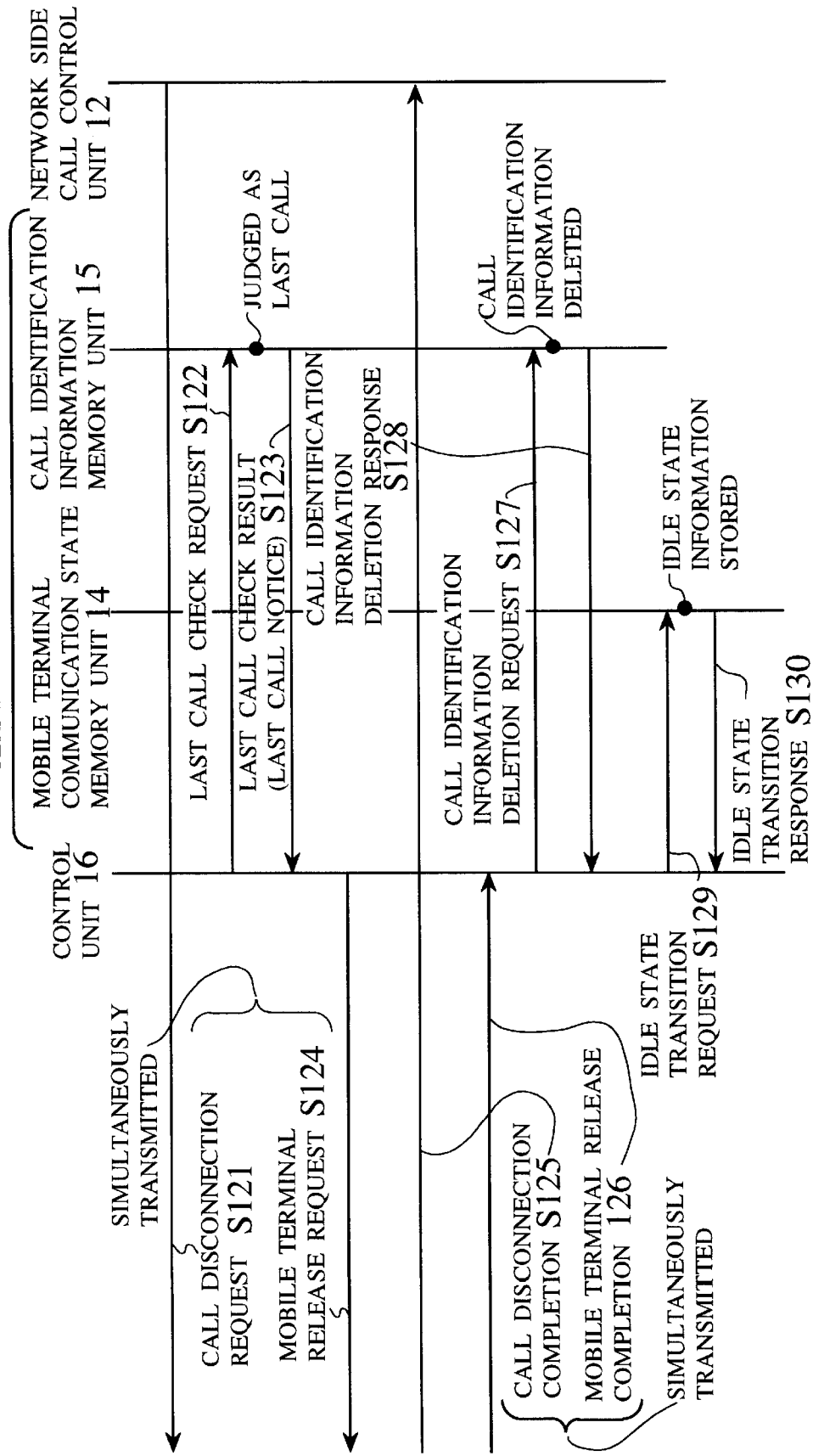
FIG. 12 is a sequence chart of a procedure for call disconnection in a network side mobile terminal unit in the system of FIG. 2.

In this case, the operation in the network side mobile terminal management unit 13 is carried out according to a sequence chart of FIG. 12 as follows.

Namely, when a call disconnection request signal is transmitted from the second network side call control unit 12 toward the second mobile terminal side call control unit 5, upon receiving this call disconnection request signal, the control unit 16 of the network side mobile terminal management unit 13 transmits a last call check request signal for this call to the call identification information memory unit 15 (S122). Then, when the call identification information memory unit 15 judges that this call is the last call, the call identification information memory unit 15 returns a last call check result signal (a last call notice) indicating that this call is the last call to the control unit 16 (S123). Then, upon receiving this last call notice, the control unit 16 transmits a mobile terminal release request to the mobile terminal side mobile terminal management unit 6 while simultaneously transmitting the received call disconnection request signal to the second mobile terminal side call control unit 5 (S121 and S124).

Then, after the call disconnection is executed in response to this call disconnection request signal by the second mobile terminal side call control unit 5, a call disconnection completion signal from the second mobile terminal side call control unit 5 is transmitted toward the second network side call control unit 12 while simultaneously a mobile terminal release completion signal from the mobile terminal side mobile terminal management unit 6 is transmitted to the control unit 16 of the network side mobile terminal management unit 13 (S125 and S126).

Then, upon receiving this mobile terminal release completion signal, the control unit 16 of the network side mobile terminal management unit 13 transmits a call identification information deletion request for this call to the call identification information memory unit 15 (S127). In response, the call identification information memory unit 15 deletes the call identification information for this call, and returns a call identification information deletion response signal to the control unit 16 (S128). Then, upon receiving this call identification information deletion response signal, the control unit 16 transmits an idle state transition request signal to the mobile terminal communication state memory unit 14 (S129). In response, the mobile terminal communication state memory unit 14 changes the stored state of this mobile terminal management unit 13 into an idle "state", and returns an idle state transition response signal to the control unit 16 (S130).

Alternatively, it is also possible to modify the procedure of FIG. 11 such that the mobile terminal release request signal and the mobile terminal release completion signal for the purpose of changing the states of the mobile terminal side mobile terminal management unit 6 and the network side mobile terminal management unit 13 into an "idle" state are to be transmitted separately from the call disconnection request signal and the call disconnection completion signal for the last call disconnection.

Figure 13:
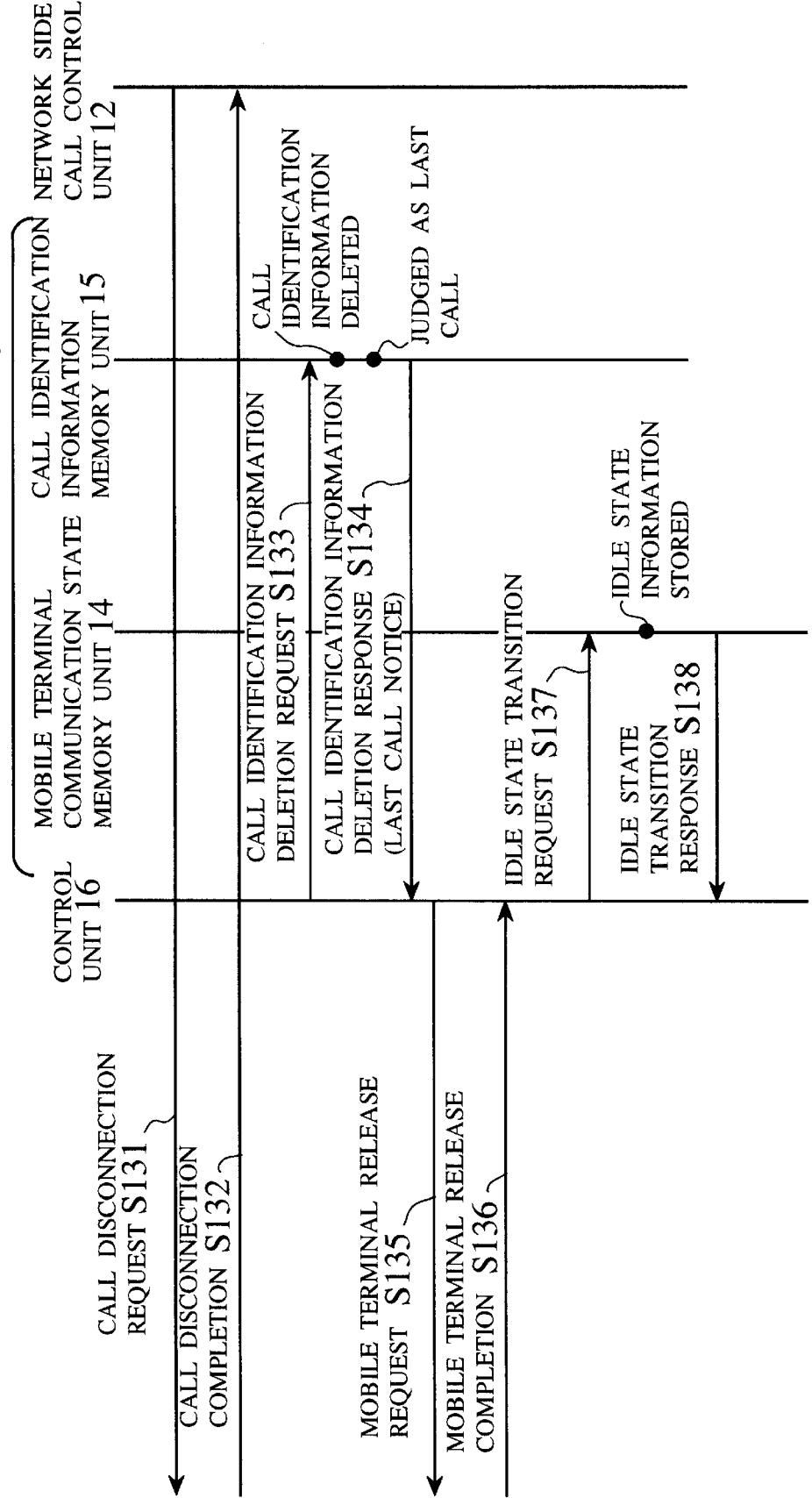
FIG. 13 is a sequence charter of another procedure for call disconnection in a network side mobile terminal management unit in the system of FIG. 2.

In this case, the operation in the network side mobile terminal management unit 13 is carried out according to a sequence chart of FIG. 13 as follows.

Namely, a call disconnection request signal is transmitted from the second network side call control unit 12 to the second mobile terminal side call control unit 5 (S131) and in response a call disconnection completion signal is transmitted from the second mobile terminal side call control unit 5 to the second network side call control unit 12 (S132).

Then, upon receiving, this mobile terminal release completion signal, the control unit 16 of the network side mobile terminal management unit 13 transmits a call identification information deletion request signal for this call to the call identification information memory unit 15 (S133). In response, the call identification information memory unit 15 deletes the call identification information for this call, while also checking whether this call is the last call or not, and returns a call identification information deletion response signal to the control unit 16 (S134) where this call identification information deletion response effectively functions as a last call notice for indicating that this call is the last call in a case of the last call.

Then, upon receiving this last call notice, the control unit 16 transmits a mobile terminal release request signal to the mobile terminal side mobile terminal management unit 6 (S135), and in response the mobile terminal side mobile terminal management unit 6 transmits a mobile terminal release completion signal to the control unit 16 of the network side mobile terminal management unit 13 (S136).

Then, upon receiving this mobile terminal release completion signal, the control unit 16 transmits an idle state transition request signal to the mobile terminal communication state memory unit 14 (S137). In response, the mobile terminal communication state memory unit 14 changes the stored state of this mobile terminal management unit 13 into an "idle"state", and returns an idle state transition response to the control unit 16 (S138).

Note that the procedure for call disconnection shown in FIG. 11. FIG. 12 and FIG. 13 is for the call disconnection on the network device 2 side, but the call disconnection on the mobile terminal device 1 side can also be carried out by the similar procedure using the mobile terminal side mobile terminal management unit 6.

As described, in the mobile communication system of FIG. 2, in addition to the call control units 4 and 5 of the mobile terminal device 1 and the call control units 11 and 12 of the network device 2, the mobile terminal management units 6 and 13 are provided in the mobile terminal device 1 and the network device 2 so as to manage each call state separately, so that it becomes possible to support multiple simultaneous communications on a single mobile terminal device, without causing a problem of the unnecessary paging operation by the network device in response to the subsequent call while being in a state of already ascertained the channel connection target from the earlier communication. Moreover, by means of these mobile terminal management units 6 and 13, it also becomes possible to collectively control all or a part of the call states on the mobile terminal device.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A mobile communication system, comprising:

at least one mobile terminal device configured to carry out multiple simultaneous communication using a plurality of independent calls and having:
more than one mobile terminal side call control units for controlling the plurality of independent calls independently at a mobile terminal side, said more than one mobile terminal side call control units having mutually different call identification information assigned thereto; and
a mobile terminal side mobile terminal management unit for managing a communication state of the mobile terminal device with respect to each one of the plurality of independent calls independently while identifying each mobile terminal side call control unit which is currently in communication; and a network device having:
- a plurality of network side call control units for controlling the plurality of independent calls independently at a network side, said plurality of network side call control units having identical call identification information as corresponding ones of said more than one mobile terminal side call control units assigned thereto; and
- a network side mobile terminal management unit, provided in correspondence to the mobile terminal device, for managing the communication state of the mobile terminal device with respect to each one of the plurality of independent calls independently and correspondences between said plurality of network side call control units and the mobile terminal device while identifying each network side call control unit which is currently in communication.

2. The system of claim 1, wherein the mobile terminal side mobile terminal management unit transmits an activation signal for changing the communication state managed by the network side mobile terminal management unit into an active state and changes the communication state managed by the mobile terminal side mobile terminal management unit into an active state, when a call origination request is received from a mobile terminal side call control unit while the communication state managed by the mobile terminal side mobile terminal management unit is in an idle state.

3. The system of claim 1, wherein the mobile terminal side mobile terminal management unit transmits a call set up permission signal to one mobile terminal side call control unit, when a call origination request is received from said one mobile terminal side call control unit while the communication state managed by the mobile terminal side mobile terminal management unit is in an active state.

4. The system of claim 1, wherein the network side mobile terminal management unit transmits a paging signal for changing the communication state managed by the mobile terminal side mobile terminal management unit into an active state and changes the communication state managed by the network side mobile terminal management unit into an active state, when a call termination request is received from a network side call control unit while the communication state managed by the network side mobile terminal management unit is in an idle state.

5. The system of claim 1, wherein the network side mobile terminal management unit transmits a call set up permission signal to one network side call control unit, when a call termination request is received from said one network side call control unit while the communication state managed by the network side mobile terminal management unit is in an active state.

6. The system of claim 1, wherein the mobile terminal side mobile terminal management unit includes:
- a call identification information memory unit for storing a call identification information assigned to each mobile terminal side call control unit which is currently in communication;
- a mobile terminal communication state memory unit for storing a communication state information indicating the communication state of the mobile terminal device;
- a distribution unit for distributing signals from the network device to said more than one mobile terminal side call control units; and
- a control unit for controlling the distribution unit according to the communication state information stored in the mobile terminal communication state memory unit, the call identification information stored in the call identification information memory unit, and a call identification information attached to each signal from the network device which identifies a network side call control device that originated each signal.

7. The system of claim 6, wherein the control unit stores the call identification information of one mobile terminal side call control unit into the call identification information memory unit at a time of transmitting or receiving a call set up signal for said one mobile terminal side call control unit, and deletes the call identification information of said one mobile terminal side call control unit from the call identification information memory unit at a time of transmitting or receiving a call disconnection signal for said one mobile terminal side call control unit.

8. The system of claim 6, wherein the control unit stores the call identification information of one mobile terminal side call control unit into the call identification information memory unit upon receiving a call set up notice signal from said one mobile terminal side call control unit, and deletes the call identification information of said one mobile terminal side call control unit from the call identification information memory unit upon receiving a call disconnection notice signal from said one mobile terminal side call control unit.

9. The system of claim 6, wherein the control unit stores an information indicating an idle communication state into the mobile terminal communication state memory unit at a time of deleting a last call identification information stored in the call identification information memory unit.

10. The system of claim 1, wherein the mobile terminal side mobile terminal management unit collectively controls all or a part of call states on the mobile terminal device by simultaneously activating related call control units which are corresponding to said all or a part of call states to be collectively controlled.

11. The system of claim 10, wherein the mobile terminal device further includes:
- a radio channel state management unit for managing states of radio channels between the mobile terminal device and the network device and notifying those radio channels which require state changes; and
- a correspondence table indicating those call control units which are corresponding to each radio channel; and
- wherein the mobile terminal side mobile terminal management unit determines the related call control units according to the correspondence table and the radio channels notified by the radio channel state management unit.

12. The system of claim 1, wherein the mobile terminal device further includes:
- a radio channel state management unit for managing states of radio channels between the mobile terminal device and the network device and notifying those radio channels which require state changes; and
- wherein the mobile terminal side mobile terminal management unit transmits a single radio channel control signal to the network side mobile terminal management unit for all the radio channels notified by the radio channel state management unit.

13. The system of claim 1, wherein the network side mobile terminal management unit includes:
- a call identification information memory unit for storing a call identification information assigned to each network side call control unit which is currently in communication;

a mobile terminal communication state memory unit for storing a communication state information indicating the communication state of the mobile terminal device;

a distribution unit for distributing signals from the mobile terminal device to said plurality of network side call control units; and a control unit for controlling the distribution unit according to the communication state information stored in the mobile terminal communication state memory unit, the call identification information stored in the call identification information memory unit, and a call identification information attached to each signal from the mobile terminal device which identifies a mobile terminal side call control device that originated each signal.

14. The system of claim 13, wherein the control unit stores the call identification information of one network side call control unit into the call identification information memory unit at a time of transmitting or receiving a call set up signal for said one network side call control unit, and deletes the call identification information of said one network side call control unit from the call identification information memory unit at a time of transmitting or receiving a call disconnection signal for said one network side call control unit.

15. The system of claim 13, wherein the control unit stores the call identification information of one network side call control unit into the call identification information memory unit upon receiving a call set up notice signal from said one network side call control unit, and deletes the call identification information of said one network side call control unit from the call identification information memory unit upon receiving a call disconnection notice signal from said one network side call control unit.

16. The system of claim 13, wherein the control unit stores an information indicating an idle communication state into the mobile terminal communication state memory unit at a time of deleting a last call identification information stored in the call identification information memory unit.

17. The system of claim 1, wherein the network side mobile terminal management unit collectively controls all or a part of call states on the mobile terminal device by simultaneously activating related call control units which are corresponding to said all or a part of call states to be collectively controlled.

18. The system of claim 17, wherein the network device further includes:

a radio channel state management unit for managing states of radio channels between the mobile terminal device and the network device and notifying those radio channels which require state changes; and a correspondence table indicating those call control units which are corresponding to each radio channel;

wherein the network side mobile terminal management unit determines the related call control units according to the correspondence table and the radio channels notified by the radio channel state management unit.

19. The system of claim 1, wherein the network device further includes:

a radio channel state management unit for managing states of radio channels between the mobile terminal device and the network device and notifying those radio channels which require state changes; and wherein the network side mobile terminal management unit transmits a single radio channel control signal to the mobile terminal side mobile terminal management unit for all the radio channels notified by the radio channel state management unit.

* * * * *